RAISED CIRCULAR SEGMENT CONTOURED MAGNETIC HEAD ASSEMBLY

Filed Aug. 24, 1967

INVENTORS
ROBERT L. ANDERSON
AVNER M. LEVY
BY Thomas E. Schatzel
ATTORNEY 3,526,885
RAISED CIRCULAR SEGMENT CONTOURED MAGNETIC HEAD ASSEMBLY
Robert L. Anderson, Palo Alto, and Avner M. Levy, Redwood City, Calif., assignors to Ampex Corporation, Redwood City, Calif., a corporation of California
Filed Aug. 24, 1967, Ser. No. 663,041
Int. Cl. G11b *5/24, 5/60*
U.S. Cl. 340—174.1 2 Claims

ABSTRACT OF THE DISCLOSURE

A transducer head assembly for a magnetic tape recorder/reproducer with the operating face of the head being contoured about the gap in such a manner that it produces a raised circular segment. The chord of the segment may be selected in accordance with the natural radius of tape wear.

BACKGROUND OF THE PRIOR ART

Conventional transducer head assemblies such as are employed in magnetic tape equipment consist of magnetic core non-magnetic material. During recording and reproducing operations the pole tips are preferably in direct contact with the coated side of the tape with the plane o fthe gap perpendicular to the tape. For multi-channel operations the head assembly consists of a plurality of transducer units carried by a common mounting means and separated by suitable magnetic and electrostatic shielding. Assuming that the equipment is designed to record and reproduce with a high degree of fidelity and accuracy, many factors must be taken into consideration in constructing the head assembly.

Conventional magnetic heads have an operating face with a substantially constant slope from the apex (gap) to the transfer edges. At the gap, the head initially comes to a substantial point and the initial wear about the gap is rapid. Consequently, due to the direct contact of head and tape, the area of contact between the head and tape increases as wear increases.

Within the area of contact, a laminar air film tends to develop intermediate the tape and head surfaces. When the area exceeds limited values, signal spacing loss occurs. For example, it is common in instrumentation type transport assemblies for the laminar air film to become an important factor when the pattern of tape-to-head contact exceeds approximately 120 mils longitudinally. According, the head life is relatively short and either the head must be replaced or possibly recontoured if adequate material remains. It is common that such prior art heads be recontoured periodically in order to realize the full head life potential.

SUMMARY OF THE INVENTION

The present invention pertains to a magnetic head assembly in which the area around the gap is contoured so that it produces a segment of a circle which will be hereinafter referred to as a "bubble." The dimensions of the "bubble" are such that when the "bubble" is worn through, the head life terminates. The dimensions are determined by the maximum width of wear area desired i.e. area of contact between the head and tape, and a natural radius of wear established by the tape and tape path. From this the rise (or height) dimension between the chord and arc of the natural radius of wear is calculated. The rise may then be added to the predetermined desired gap depth of the head normal to the tape path. From the calculated rise and using the chord of the natural tape path as the maximum wear width, the radius of the "bubble" is realized. During the machining processes the "bubble" may be included with dimensions according to the calculations.

The "bubble" contour head has proven to provide advantages both electrically and mechanically. The signal amplitude is substantially stable throughout head life because little or no air bearing effect takes place between the head and tape. The bubble is contoured so that the head does not require recontouring during its useful life. Also, longer head life is realized due to the more uniform wear pattern throughout the head life.

DESCRIPTION OF THE PREFERRED EMBODIMENTS

Figure 1:
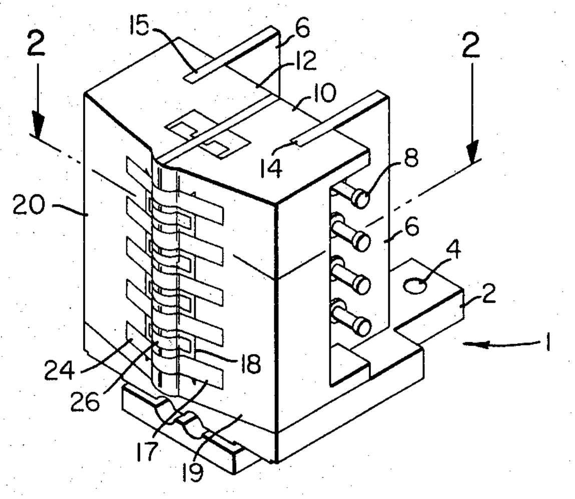
FIG. 1 is a perspective view of a multi-channel (4) magnetic record head assembly incorporating the teachings of the present invention.

FIG. 1 illustrates in perspective a multi-channel magnetic head assembly, referred to by the general reference character 1, including the teachings of the present invention. The illustrated head assembly 1 is presently being incorporated on a magnetic tape instrumentation recorder/reproducer. The assembly 1 includes a mounting plate 2 having an aperature 4 adapted to receive a fastening means, e.g. threaded bolt, for securing the assembly to a transport (not shown). To facilitate electrical connection to the recorder electronics, a pair of insulated terminal boards 6 carrying terminal pins are included. The terminal boards 7 are secured to a pair of side pieces 10 and 12 at a pair of slots 14 and 15. As indicated in FIG. 2 the boards are further secured by an epoxy 16 disposed within the otherwise internal void areas of head assembly 1.

The side pieces 10 and 12 preferably comprise a non-magnetic material having a multiple of longitudinal alternate long and short slots 17 and 18 opening on their respective operating faces 19 and 20 parallel with the intended direction of tape travel. The long slots 17 are adapted to receive a magnetic shield member 24 and the short slots 18 adapted to receive individual transducers 26. The head obviously may include as many transducers as there are tracks on the tape.

The shields are designed so as to shunt magnetic fields between the various transducers 26 and aid in preventing cross-talk. The shields preferably comprise a magnetic material, e.g. mu-metal, which may be laminated with copper or aluminum. Considering the length dimensions as parallel to the direction of tape travel, the shields are substantially longer than the transducers 26 along the operating faces 19 and 20. Though not clearly depicted, the height of the shields is also substantially greater than that of the transducers. The spacing between the shields and transducers may be selected to coincide with IRIG standards (Inter-Range Instrumentation Group—White Sands, N. Mex.).

Figure 2:
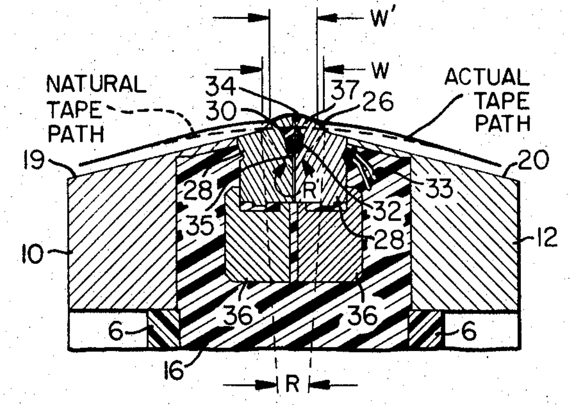
FIG. 2 is a partial cross-sectional view taken along the lines 2—2 of the head assembly of FIG. 1 and illustrating the "bubble" around the transducing gap in more detail.

Referring to FIG. 2 which is a cross-sectional view along the line 2—2 of FIG. 1, the transducer 26 is illustrated in more detail. The illustrated transducer comprises a split ring core member having a pair of core segments 28 in face-to-face relationship. The segments 28 form an aperture 30 to receive an energizing coil 32 which includes a pair of leads 33 for joining associated terminals 8. The cores 28 also form a non-magnetic front transducing gap 34 the plane of which is normal to the direction of tape movement. Also, as indicated, a back gap 35 is formed. The bottom surfaces of the cores and shields are received by a pair of non-magnetic supports 36 which aid in aligning and providing mechanical support for the shields 24 and cores 28.

The core members 28 include a contour raised arcuate segment 37, previously referred to as a "bubble," and which as illustrated is symmertical about the gap 34. The "bubble" 37 has a chord of width W which is substantially normal to the gap 34. As discussed herein, the chord of width W is selected such that it lies coincident with a chord of a natural arcuate tape path positioned to intersect simultaneously with the apex of the aperture 30 and the bottom of gap 34. The dimensions of the chord W are further selected according to the maximum area of contact between the tape and head that can be tolerated. As indicated in FIG. 2, the chord of the actual arcuate area of contact has a width designated W which may vary slightly during the life of the head but which has proven to be substantially constant throughout head life. In manufacturing head assemblies 1, it has been found appropriate to assemble the head assembly and then contour grind the "bubble" according to desired specifications. As previously mentioned the "bubble" dimensions are dependent upon tape-to-head contact limitations. The maximum distance of tape-to-head contact is dependent upon the layer of air that forms intermediate the tape and core. This air layer tends to lift the tape from the head about the top of the gap 34 causing loss of signal. The air layer is dependent upon both tape speed and contact area. For example, for an instrumentation analog type recorder with a speed capacity of 120 inches per second, an arcuate contact of approximately 120 mils is recommended as a maximum width of contact W.

The bubble 37, being arcuate provides a structure in which even initially, there is a substantial area of contact corresponding to the chord width W' between the head and tape but which never exceeds the predetermined maximum corresponding to the chord width W. Accordingly, the amount of wear of the head is relatively uniform throughout, contrary to the situation wherein the core is substantially pointed at the gap in which case the initial head wear is substantial. Though it is not essential that the head wear out at the point the natural tape path is realized, it has been found desirable to select W so as to coincide with the chord of the natural path of the tape. By so doing, when the natural path is realized, the gap terminates and the head is worn out. Thus there is natural friction maintained between the head and tape during the life of the head. During head life, the natural path is distorted and the tape tends to assume its natural path. In selecting W to be realized at substantially the same point at which the tape realizes its natural path the need to utilize extra pressure pads for maintaining the contact beyond the natural path is alleviated.

Figure 3:
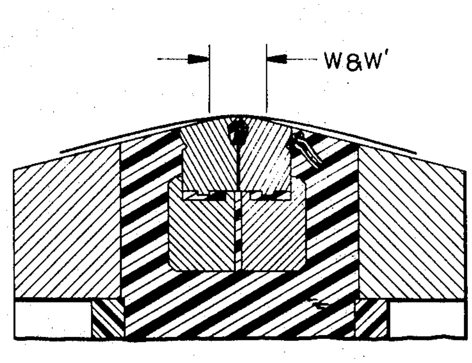
FIG. 3 is similar to FIG. 2 but illustrating the gap area after the head has served its useful life.

Viewing FIGS. 2 and 3 to more clearly illustrate a method for determining preferable dimensions of the "bubble" 37, and assuming it is desirable to have the head wear out when the natural tape path is realized, first the radius R of the natural tape path is determined; second, the chord which provides the maximum tolerable tape-to-head contact is determined (e.g. 120 mils as previously mentioned); third, the maximum vertical distance between the chord and the natural tape path is calculated, and then the desired gap depth 34 is added to determine the radius R' for the arc of the "bubble." The gap depth 34 extends between the apex of "bubble" 37 and the apex of the natural tape path. The chord is coincident to both the "bubble" 37 and natural tape path so that at the point the natural tape path is realized the head is worn out. The actual gap depth 34 is a function of desired signal-to-noise rating, bias frequency, etc. When the head is used as a reproduce head other considerations, for example, reproduce output are considered. Obviously, it is desirable to have as large a gap as possible so as to prolong head life, however, as the gap depth is decreased the efficiency increases. FIG. 3 illustrates a "worn-out" head assembly in which W occurs at the intersection of the aperture 30 and front gap 34. It may be further noted that this is also the point at which the natural and actual tape path coincide. (Note: In FIG. 3, the designating numerals are omitted since they are analogous to those of FIG. 2.)

Figure 4:
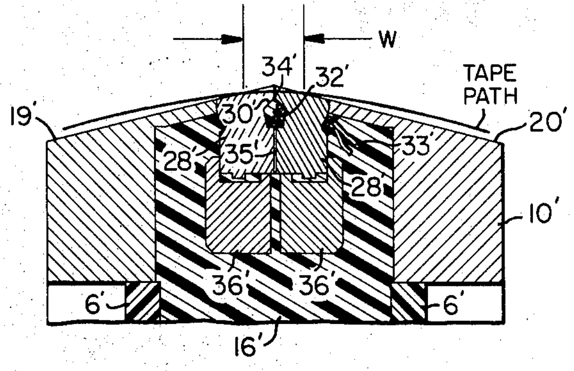
FIG. 4 PRIOR ART
FIG. 4 is a cross-sectional view of the head assembly according to the known prior art.

To more fully appreciate the teachings of the present invention, FIG. 4 illustrates the cross-section of a standard prior art head of which the operating face of the cores and side pieces are at a constant slope with the apex at the gap. In FIG. 4 the same numerals are used with a prime designation for distinction. It may be noted that in the structure of FIG. 4 the initial wear is rapid due to the small tape-to-head contact. Assuming that the gap depth is the same as for FIG. 2, when the head is worn to the extent that the tape-head contact area corresponds to chord width W, there is substantial gap remaining. Thus, it necessitates that the head assembly 1 be removed from the transport and discarded, or recontoured. Removing and then replacing or recontouring the head is time consuming, bothersome, and costly. It may occur during operation of the equipment requiring a shut-down and potential loss of valuable data. Also if recontouring is selected, generally the head must be returned to the manufacturer. Obviously, a head assembly as of the present invention which overcomes these problems without a sacrifice of total head life is highly advantageous.

It will be obvious to those skilled in the art that the present invention may include numerous modifications other than those specifically set forth. For example, rather than expose the core members directly to frictional contact with the tape, pole shoes contoured in accordance with the disclosed "bubble" may be mounted on core segments. This may be especially desirable where ferrite members are desired for the core material. Since ferrite is relatively difficult to machine and has shorter resistance to friction than other metallic materials, it may be desirable to utilize "bubble" contoured pole shoes around the transducing gap. Thus, for purposes of this disclosure, core means include core comprising separate core segments and core segments in combination with separate pole shoes.

I claim:

1. A magnetic transducer head assembly for a recorder/reproducer of the class wherein a magnetic tape is transported past and adjacent said assembly and wherein said head assembly includes an operating face of which at least a part includes an exposed portion of a core member with an intermediate transducing gap in frictional engagement with the tape, and of which the head life is dependent upon a preselected gap depth and the proximity of the tape to the gap, characterized by said head assembly being formed with a raised circular segment symmetrical about said gap and having a radius less than the radius of a natural tape path traversing said assembly, said raised circular segment having a chord coincident with a chord of said natural tape path defining a maximum permissible surface area of frictional engagement between said tape and core means, and said raised circular segment having an apex spaced outwardly from the apex of said natural tape path by an amount coinciding with said gap depth.

2. The structure of claim 1 in which said head assembly includes a plurality of simularly contoured parallel spaced core means and shielding spaces intermediate said core means.

References Cited

UNITED STATES PATENTS

| | | | |
|---|---|---|---|
| 3,349,193 | 10/1967 | Vice | 340—174.1 |
| 3,378,647 | 4/1968 | Hirota | 340—174.1 |
| 3,170,045 | 2/1965 | Baumeister | 340—174.1 |

BERNARD KONICK, Primary Examiner

V. P. CANNEY, Assistant Examiner

U.S. Cl. X.R.

179—100.2; 346—74